United States Patent [19]

Burkel et al.

[11] Patent Number: 4,504,770
[45] Date of Patent: Mar. 12, 1985

[54] ADJUSTING DEVICE FOR ROTARY ANGLE ADJUSTMENT OF A FINAL CONTROL ELEMENT

[75] Inventors: Rainer Burkel, Le Chesnay; René Bayle, Pierrefitte; Jean Denamps, Asnières; Roger Goussin, Chaville, all of France

[73] Assignee: Robert Bosch GmbH, Stuttgart, Fed. Rep. of Germany

[21] Appl. No.: 566,967

[22] Filed: Dec. 30, 1983

Related U.S. Application Data

[63] Continuation of Ser. No. 252,754, Apr. 10, 1981, abandoned.

[30] Foreign Application Priority Data

Apr. 11, 1980 [DE] Fed. Rep. of Germany ....... 3013984

[51] Int. Cl.³ ............................................. G05B 11/01
[52] U.S. Cl. .................................. 318/560; 335/272; 310/193
[58] Field of Search ............... 318/560, 561; 335/272, 335/279, 281; 310/193, 216

[56] References Cited

U.S. PATENT DOCUMENTS

| 3,382,573 | 5/1968 | Mantelet | 310/216 |
| 3,749,956 | 7/1973 | Reiss | 310/216 |
| 3,886,383 | 5/1975 | Ross et al. | 310/216 |
| 4,118,659 | 10/1978 | Klemm | 318/560 |
| 4,164,722 | 8/1979 | Garvey | 335/272 |
| 4,219,625 | 8/1980 | Hayrand et al. | 335/272 X |
| 4,268,772 | 5/1981 | Workman | 310/216 X |
| 4,303,901 | 12/1901 | Grimm et al. | 335/272 |
| 4,359,706 | 11/1982 | Flack | 335/281 |

Primary Examiner—B. Dobeck
Attorney, Agent, or Firm—Edwin E. Greigg

[57] ABSTRACT

An adjusting device for precise rotary angle adjustment of final control elements in closed- or open-loop control devices. The adjusting device comprises a rotary magnet apparatus in which parallel air gaps are formed between the poles of the armature and the magnet poles of the armature counterpart. In order to attain constant torques over the angle of rotation of the armature, when the electric current applied to the coil is constant, the end faces of the armature poles are embodied as wedge-shaped.

12 Claims, 4 Drawing Figures

ADJUSTING DEVICE FOR ROTARY ANGLE ADJUSTMENT OF A FINAL CONTROL ELEMENT

This is a continuation of copending application Ser. No. 252,754, filed Apr. 10, 1981, now abandoned.

BACKGROUND OF THE INVENTION

The invention relates generally to adjusting device for rotating angle adjustment on final control elements in closed or open-loop devices, and more particularly, to a rotary electromagnet for adjusting the position of a throttle device in an internal combustion engine.

A known adjusting device of this kind (U.S. Pat. No. 3,630,643) has two coil bodies on a U-shaped crosspiece, between the poles of which a rod armature can be rotated counter to the force of a restoring spring. Rotary magnets of this kind, in order to adjust a fuel injection pump governor, must bring relatively large adjusting forces to bear; the precision of adjustment is then attained with the aid of positional feedbacks. The expense required for adjusting devices of this kind is correspondingly high.

OBJECT AND SUMMARY OF THE INVENTION

The adjusting device according to the invention, which comprises a rotary electromagnet device in which parallel air gaps are formed between the magnet poles and the armature poles, has the advantage over the prior art that a compact structure can be attained. It is furthermore possible to omit feedback of the position of the final control element, because the embodiment of the armature, which has wedge-shaped pole end faces which progressively overlap the parallel-disposed magnet pole end faces, makes it possible to generate torques which are substantially constant over a wide rotary angle as long as the electric current applied to the magnet coil is constant. In this manner, an unequivocal association between the position of the final control element and the intensity of the electric current applied to the coil is attained.

The invention will be better understood and further objects and advantages thereof will become more apparent from the ensuing detailed description of a preferred embodiment taken in conjunction with the drawings.

DESCRIPTION OF THE PREFERRED EMBODIMENT

Figure 1:
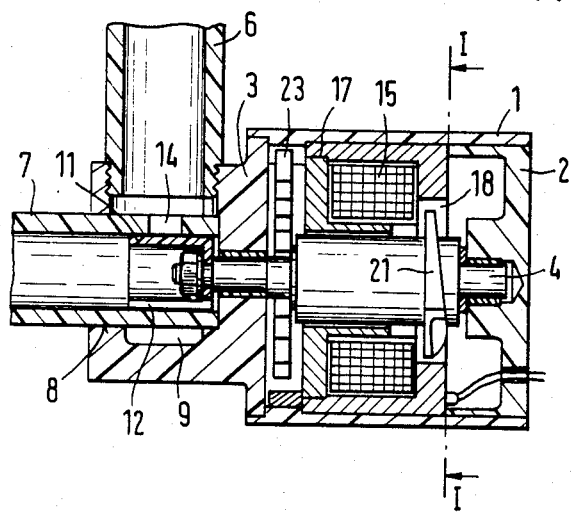
FIG. 1 is a section taken through the adjusting device for rotary angle adjustment having an associated line for an operating substance, the passageway cross section of which is controlled by a rotary slide actuated by the adjusting device.

The adjusting device shown in FIG. 1 includes a plastic cylindrical housing 1, having opposite ends carrying respective caps 2 and 3 which support an armature shaft 4 extending therebetween. The cap 3 at one end is embodied as a coupling piece for two tube parts of a line. This line may be, for example, an air bypass line of an internal combustion engine. A first tube 6 of this line is inserted into the coupling piece 3 perpendicular to the axis of the armature shaft 4, while the outer tube 7 is inserted into the coupling piece 3 coaxially with the axis. The coaxial tube 7 is located in a blind bore 8 of the coupling piece 3 and is surrounded there by an annular chamber 9, into which the first tube 6 discharges. The coupling piece 3 is penetrated by one end of the armature shaft 4, which, at its outermost portion, is connected with a rotary slide 11 of cuplike embodiment. The cylindrical jacket of the rotary slide 11 is guided tightly within the inner bore of the tube 7 and has one or more apertures 12 distributed at identical angular distances on the circumference. In association with these apertures 12, the tube 7 has passageway openings 14, which, in an appropriate position of the rotary slide 11, furnish a connection between the interior of the tube 7 and the annular chamber 9.

The adjusting device housed in the housing 1 has a magnet of the shielded electromagnet type, having an annular coil 15 which surrounds the armature shaft 4 and is enclosed within a cup-shaped housing 17 made of material having the magnetic properties of soft iron and serving as an armature counterpart. On the open end 18 of the cup-shaped housing 17, two oppositely disposed poles 19 protrude inward, in part axially limiting the coil 15. An armature 20, disposed in the radial plane of the poles 19, includes opposite ends or poles which are associated respectively with the magnetic poles 19. The armature poles have end faces 21 which extend in a circular arc and, together with correspondingly embodied end faces 22 of the poles 10, form parallel air gaps when they are in an overlapping position. The lengths of the various end faces 21 and 22 each correspond to a rotary angle of 80°.

As a restoring force, a helical spring 23 is also provided in the housing 1; it is supported on the housing and connected to the armature shaft 4.

Figure 2:
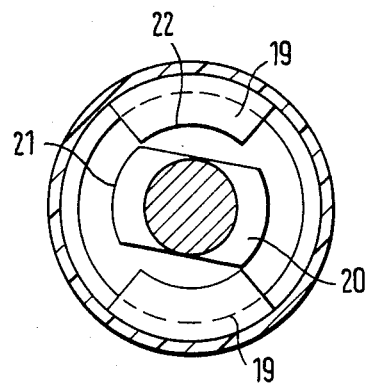
FIG. 2 is a section taken through the exemplary embodiment of FIG. 1 along the line I—I.
Figure 3:
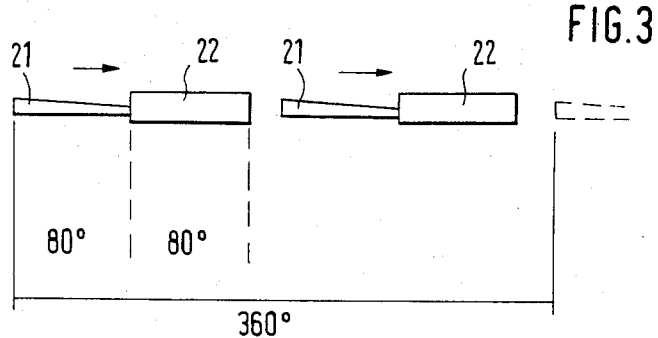
FIG. 3 is a modification of the end faces of the armature poles and the magnet poles in the outset position of the armature.
Figure 4:
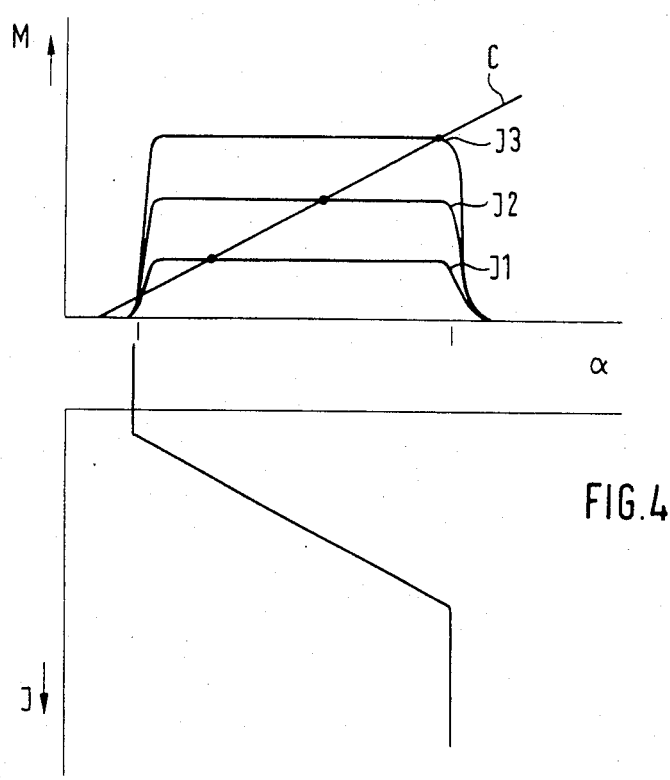
FIG. 4 is a diagram showing the attainable torques plotted over the rotary angle $\alpha$ at various electric current intensities.

While FIG. 2 is a plan view corresponding to the section along the line I—I through the housing 1, FIG. 3 shows the shape of the end faces 22 of the magnet poles and that of the apposing end faces 21 of the armature poles. It will be appreciated from the drawing that the end faces 22 of the magnet poles 19 have a substantially constant lateral width from one longitudinal end to the other, while in contrast the end faces 21 of the armature poles are embodied as substantially wedge shaped so as to be of increasing lateral width from one longitudinal end to the other. The modification according to FIG. 3 shows the armature 20 in its position of rest which is fixed by means of a stop; the arrows indicate the intended direction of rotation. The shape of the end faces 21 is such that the wedge points in the direction of rotation. As a result of this embodiment, the surface area of the overlap between the armature pole end faces 21 and the magnet pole end faces 22 increases in progressive fashion both longitudinally and laterally as the rotary direction of the armature progresses. This embodiment, in an advantageous manner, makes it possible to obtain the constant torque characteristics shown in FIG. 4. FIG. 4 shows torque v. rotary angle curves at various current intensities I1—I3 which can be made to flow through the coil 15. It can be seen that the torque which acts upon the armature or the armature shaft is substantially independent of the rotary angle $\alpha$ for a given current intensity. Thus, with a given spring characteristic C, a linear association can be attained betweeen the triggering current I and the rotary angle α, so that it is possible to adjust quite precisely the passageway cross sections which can be controlled by the rotary slide 11. The slide 11 is pressure-compensated, in particular when there is a multiplicity of aperture 12 or passageway openings 14, so that in this case very limited retroactive effects on the adjustment are to be expected.

The solution according to the invention naturally allows other technically equivalent embodiments; for instance, the magnet poles can be embodied as having the variable end face cross sections; or in another embodiment, the armature 20 may also have poles of claw-type embodiment, which can cooperate with the axial end face of the armature counterpart 17. The adjusting device, which in the exemplary embodiment has an advantageous form, may advantageously be put to use in internal combustion engines for the precise metering of operating substances such as fuel or air.

The foregoing relates to a preferred exemplary embodiment of the invention, it being understood that other embodiments and variants thereof are possible within the spirit and scope of the invention, the latter being defined by the appended claims.

What is claimed and desired to be secured by Letters Patent of the United States is:

1. An adjusting device for rotary angle adjustment on a final control element in a closed—or open—loop control device, which comprises:
    an axis;
    an armature that is operationally connectd to said final control element and which is rotatable about said axis counter to a restoring force which increases with increased angular displacement of said final control element,
    said armature comprising material having the magnetic properties of soft iron and including a plurality of elongated armature poles, each armature pole including an end face;
    restoring means providing said restoring force; and
    a stationary armature counterpart which comprises material having the magnetic properties of soft iron and which includes a like plurality of elongated magnet poles, each magnet pole including an end face, the magnet poles being geometrically matched with the armature poles to form respective longitudinally extending pairs of an armature pole and a magnetic pole, said armature pole end face having boundaries defining a surface area which during rotation of the armature in response to rotary angle adjustment of the control element overlaps the boundaries of an opposing surface area of a magnetic pole end face and forms therebetween an air gap, the magnetic attraction between opposed pole end faces being proportioned to the extent of surface area overlap between said pole pairs, at least one end face of each pair of poles having substantially constant lateral width from one longitudinal end to the other, said other pole end face having substantially wedge shape so as to be of increasing lateral width from one end to the other, the extent to which the boundaries of said surface areas overlap simultaneously progressively increase in both longitudinally and laterally extending directions as said armature is rotated in response to an increase in the rotary angle adjustment of said final control element counter to said restoring force, and said stationary armature counterpart also including a magnet coil to which an electric current intensity is applied.

2. An adjusting device according to claim 1, in which: the end faces of the magnet poles have the substantially constant lateral width from one longitudinal end to the other and the end faces of the armature poles have the substantially wedge shape so as to be of increasing lateral width in the direction of rotation of the armature from one longitudinal end to the other.

3. An adjusting device as defined by claim 1, in which the end faces of the magnet poles and of the armature poles are substantially partial cylindrical surfaces disposed concentrically about the rotary axis of the armature.

4. An adjusting device as defined by claim 3, in which the armature is affixed to an armature shaft extending axially through the magnet coil, which is enclosed within a cup-shaped housing acting as said armature counterpart and having on one end face of said magnet poles, said magnet poles extending inwardly toward the armature shaft and axially confining the magnet coil within the cup-shaped housing.

5. An adjusting device as defined by claim 4, in which a helical spring serves as the restoring force means.

6. An adjusting device as defined by claim 5, in which the armature shaft is supported within a plastic housing which tightly encloses both the cup-shaped housing receiving the magnet coil and the helical spring, and wherein one end of the armature shaft protrudes through the plastic housing to the outside.

7. An adjusting device as defined by claim 1, in which the final control element is embodied as a rotary slide affixed to the outer end of the armature shaft and acting as a throttle device for metering an operating substance such as fuel or air in an internal combustion engine.

8. An adjusting device as defined in claim 7 in which said rotary slide is cup-shaped and has at least one aperture disposed in a jacket face, said aperture communicating with an associated passageway opening to a line carrying an operating substance of the internal combustion engine, the rotary slide being radially guided in a part of said line.

9. An adjusting device as defined by claim 8 in which the line carrying the rotary slide comprises two tubes disposed at right angles to one another in a coupling piece, within which coupling piece the end of one tube receives said rotary slide, said rotary slide having at least one passageway in said jacket face communicating with the other tube within the coupling piece.

10. An adjusting device for rotary angle adjustment on a final control element in a closed -or open- loop control device, which comprises:
    an axis;
    an armature that is operationally connected to said final control element and which is rotatable about said axis counter to a restoring force which increases with increased angular displacement of said final control element,
    said armature comprising material having the magnetic properties of soft iron and including a plurality of elongated armature poles, each armature pole including an end face;
    restoring means providing said restoring force; and
    a stationary armature counterpart which comprises material having the magnetic properties of soft iron and which includes a like plurality of elongated magnet poles, each magnet pole including an end face, the magnet poles being geometrically matched with the armature poles to form respective longitudinally extending pairs of an armature pole and a magnetic pole, said armature pole end face having boundaries defining a surface area which during rotation of the armature in response to rotary angle adjustment of the control element overlaps the boundaries of an opposing surface area of a magnetic pole end face and forms therebetween an air gap, the magnetic attraction between opposed pole end faces being proportional to the extent of surface area overlap between said pole pairs, at least one end face of each pair of poles having substantially constant lateral width from one longitudinal end to the other, said other pole end face having substantially wedge shape so as to be of increasing lateral width from one end to the other, said stationary armature counterpart also including a magnet coil to which an electric current intensity is applied, and the extent to which the boundaries of said surfaces areas overlap being correlated with the rotary angle adjustment of the final control whereby the armature is capable of generating torques that are substantially constant over a wide rotary angle as long as the intensity of the current applied to the magnet coil is constant.

11. An adjusting device as defined by claim 10, in which the restoring force is provided by a helical spring having a given spring characteristic, whereby since the torque acting on the armature is substantially independent of the rotary angle for a given current intensity, a linear association between the current intensity and the rotary adjustment angle is attained.

12. An adjusting device for rotary angle adjustment on a final control element in a closed—or open—loop control device, which comprises:
an axis;
an armature that is operationally connected to said final control element and which is rotatable about said axis counter to a restoring force which increases with increased angular displacement of said final control element;
said armature comprising material having the magnetic properties of soft iron and including a plurality of elongated armature poles, each armature pole including an end face;
restoring means providing said restoring force; and
a stationary armature counterpart which comprises material having the magnetic properties of soft iron and which includes a like plurality of elongated magnet poles, each magnet pole including an end face, the magnet poles being geometrically matched with the armature poles to form respective longitudinally extending pairs of an armature pole and a magnetic pole, said armature pole end face having boundaries defining a surface area which during rotation of the armature in response to rotary angle adjustment of the control element overlaps the boundaries of an opposing surface area of a magnetic pole end face and forms therebetween an air gap, the magnetic attraction between opposed pole end faces being proportioned to the extent of surface area overlap between said pole pairs, and the opposed pole faces being proportionately shaped with respect to each other so that the common overlapping surface area therebetween increases or decreases with the progression or regression rotation of said armature.

* * * * *